July 2, 1974  E. D. ROGERS  3,822,217
FOAM FORMING DEVICE
Filed Feb. 9, 1973  6 Sheets-Sheet 1
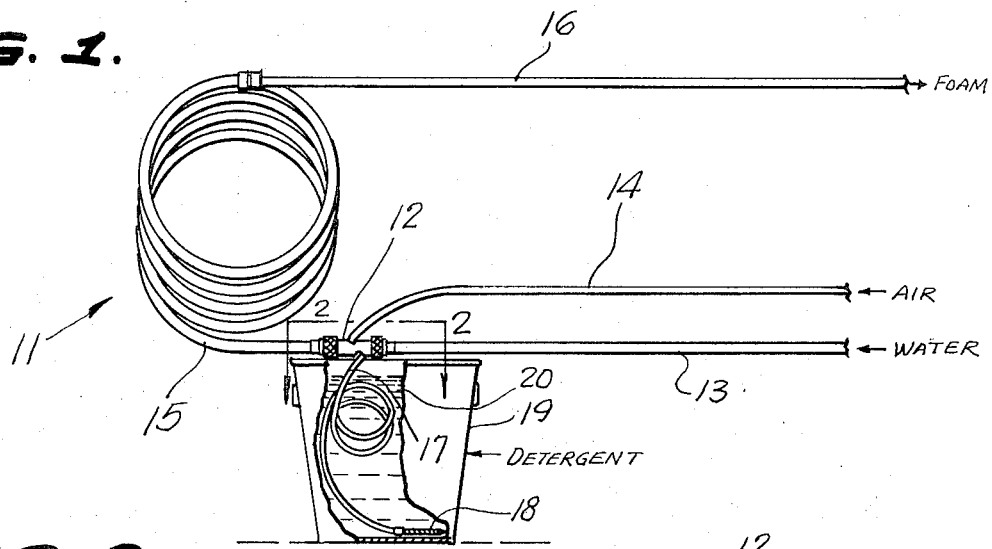
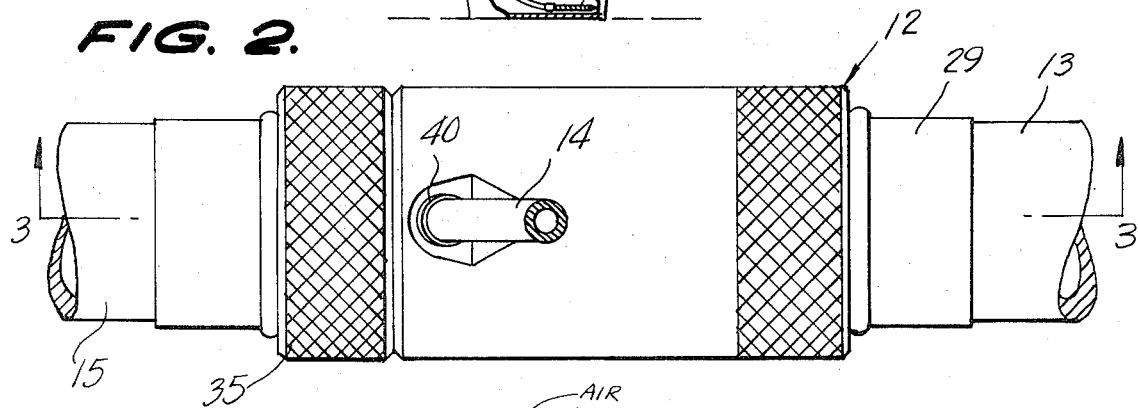
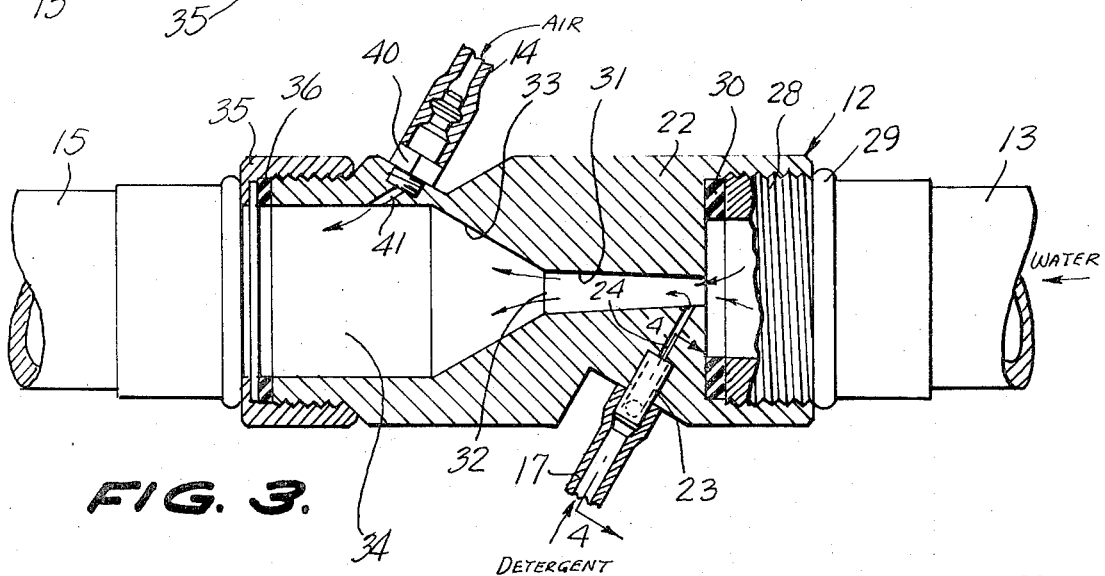
INVENTOR.
EUGENE D. ROGERS,
BY
Berman, Davidson & Berman,
ATTORNEYS.

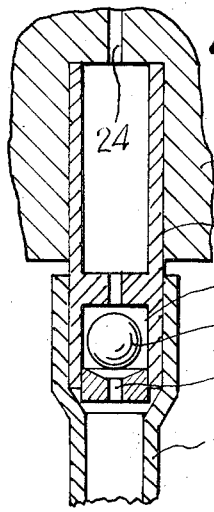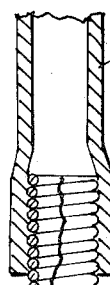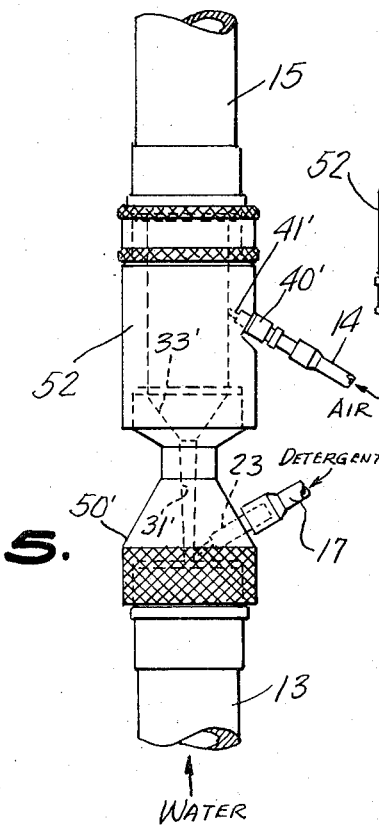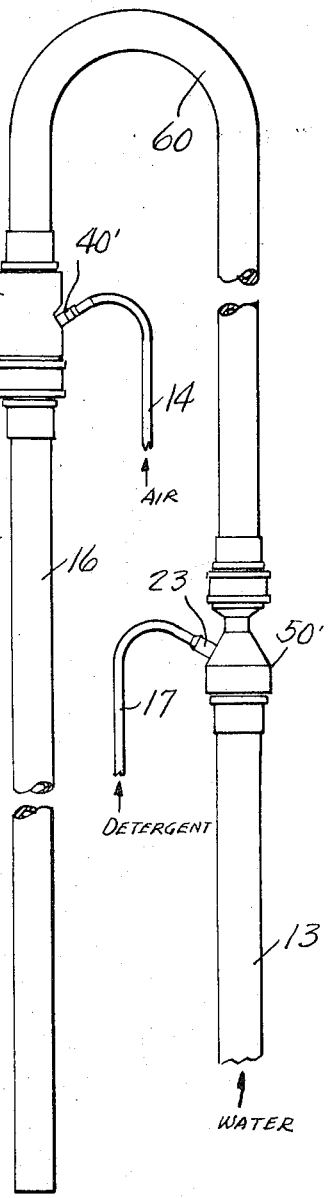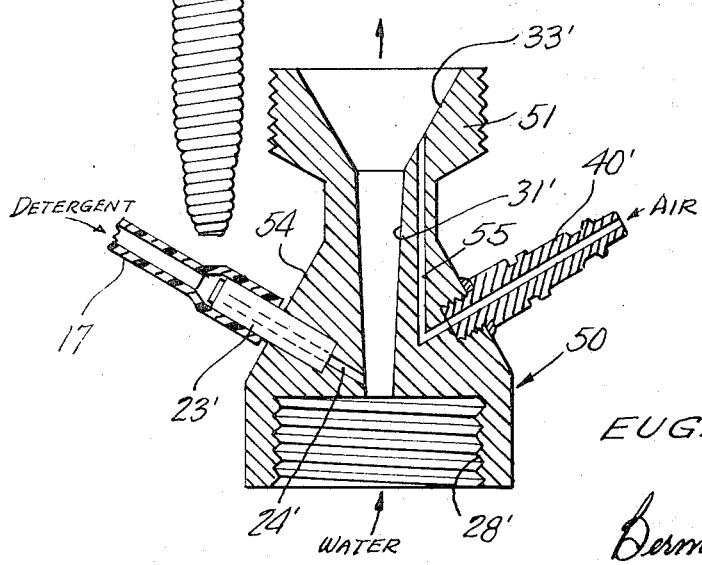

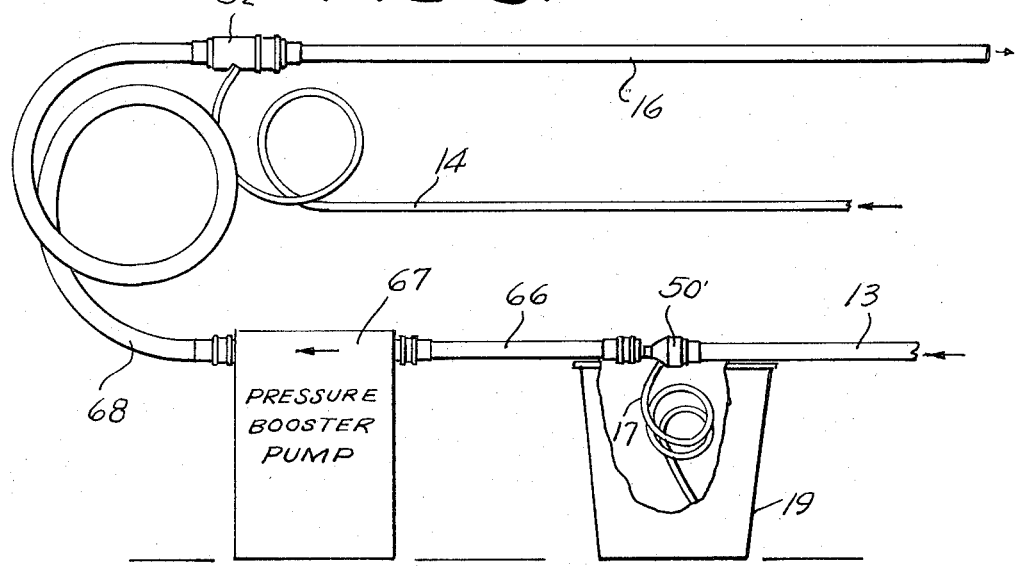
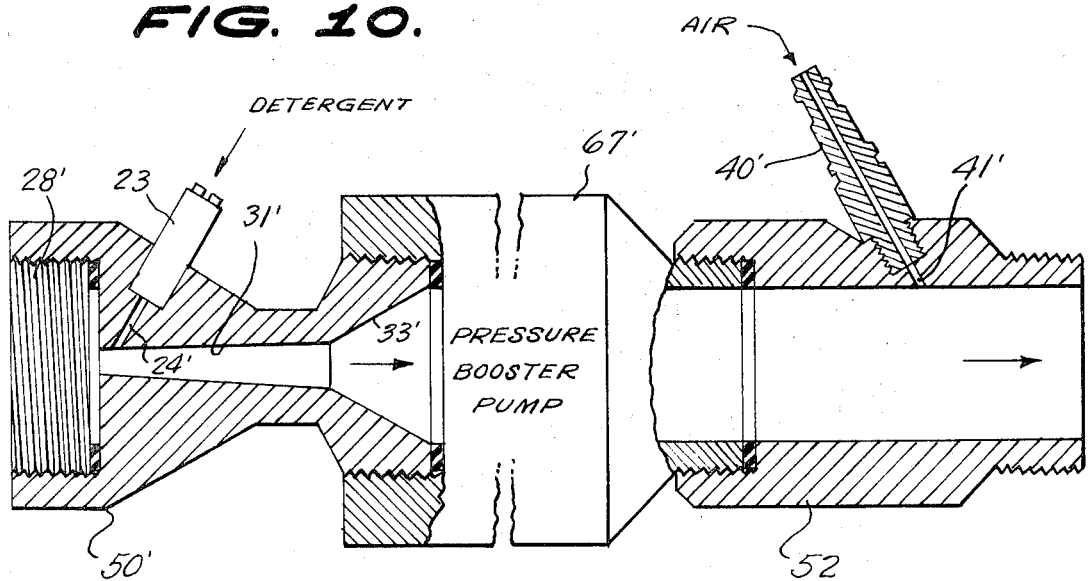

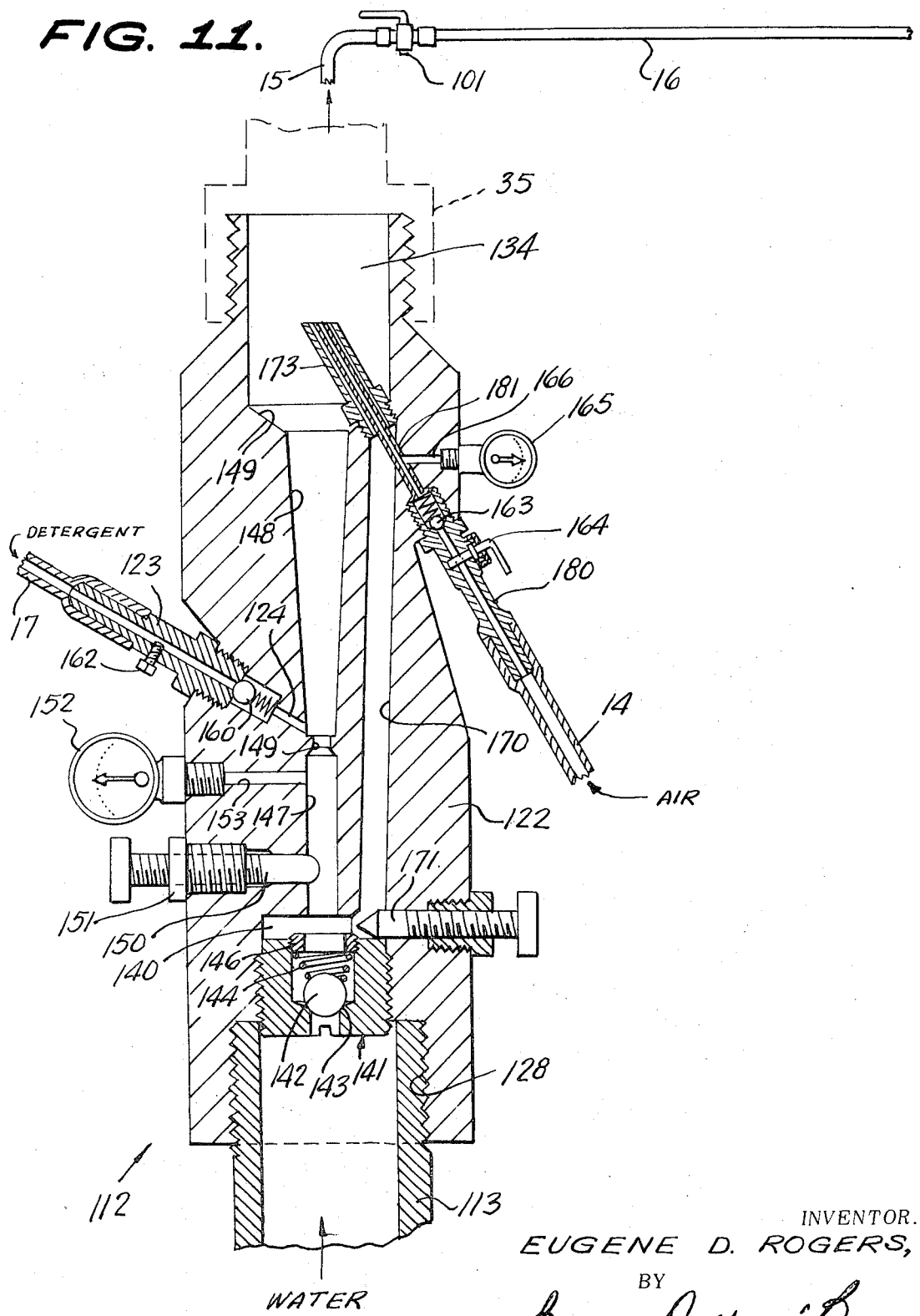

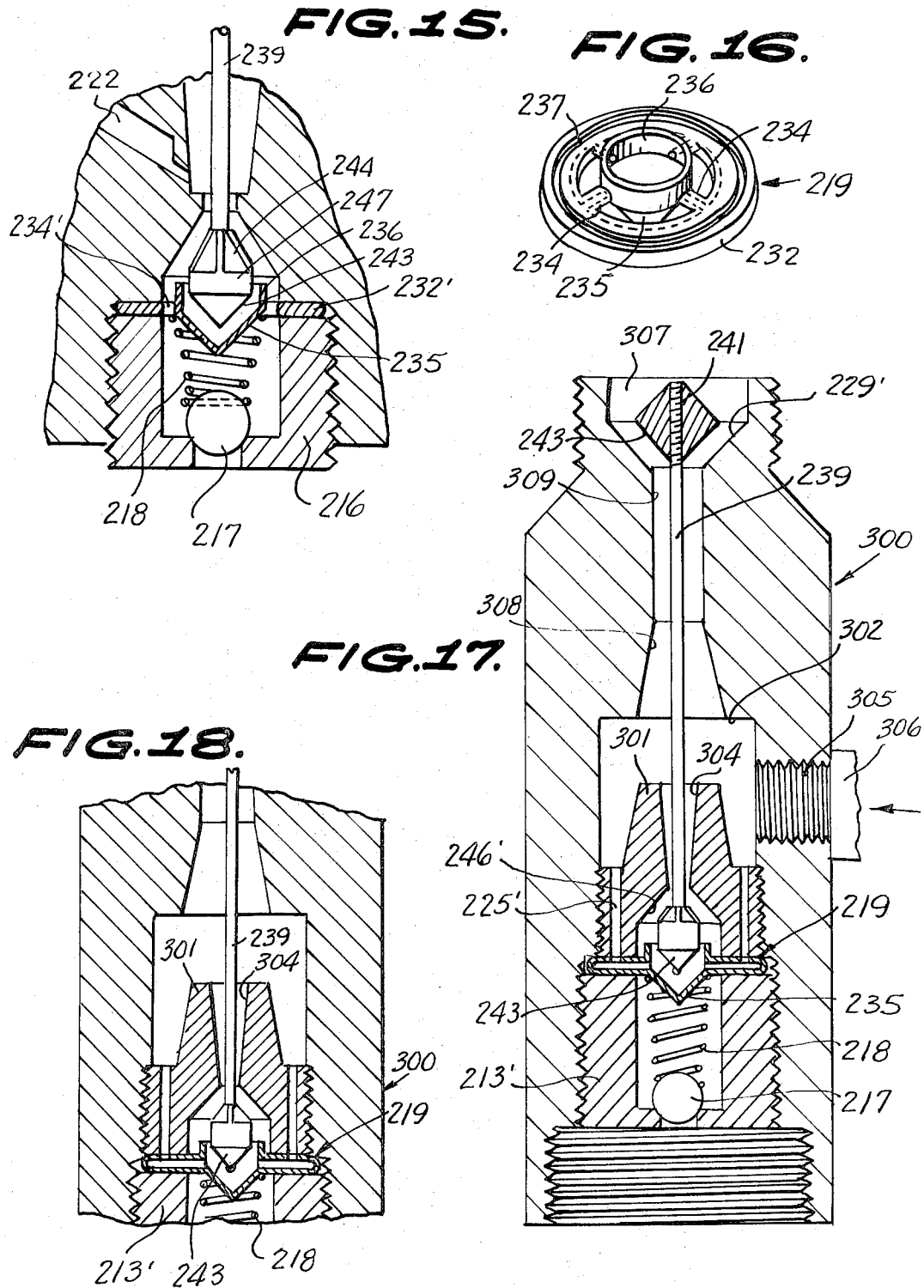

United States Patent Office 3,822,217
Patented July 2, 1974

3,822,217
FOAM FORMING DEVICE
Eugene D. Rogers, Chula Vista, Calif.
(3318 Kennelworth Lane, Bonita, Calif. 92002)
Continuation-in-part of application Ser. No. 203,174, Nov. 30, 1971, which is a continuation-in-part of application Ser. No. 73,324, Sept. 18, 1970, both now abandoned. This application Feb. 9, 1973, Ser. No. 331,261
Int. Cl. A62c 5/04; B01d; B01f
U.S. Cl. 252—359 E
25 Claims

ABSTRACT OF THE DISCLOSURE

Foam forming apparatus consisting of a handle having a water supply line connected thereto and having an expanded venturi passage leading to an outlet chamber. The conduit has an inlet check valve for detergent at the narrow end of the venturi passage, which provides suction for drawing detergent into the incoming stream of water. A source of compressed air is connected through a fitting to the outlet chamber where the air is mixed with the water and detergent and generates foam. A booster pump may be employed in the assembly ahead of the air inlet fitting.

---

This is a continuation-in-part of patent application Ser. No. 203,174, filed Nov. 30, 1971, which in turn is a continuation in part of Ser. No. 73,324 filed Sept. 18, 1970, both abandoned and both entitled "Foam Forming Device."

This invention relates to improvements in foam generators, and more particularly to apparatus for producing foam for use in detergent cleaning operations, fire fighting operations, and for any other purpose where foam is desirable.

A main object of the invention is to provide a novel and improved foam-generating apparatus which is relatively simple in construction, which is easy to set up for use, and which provides a rich foam mixture which will readily adhere to vertical and horizontal surfaces, as well as providing effective surface coverage where applied.

A further object of the invention is to provide an improved foam-generating apparatus which is inexpensive to fabricate, which is compact in size, and which does not require adjustments.

A still further object of the invention is to provide an improved foam-generating apparatus which can be easily used with small sized containers such as buckets or other relatively mobile containers, which can be quickly placed in operation without requiring any adjustments, and which operates efficiently and without diluting the source of detergent with which it is employed.

A still further object of the invention is to provide a small, relatively simple, foam-generating unit which is easy to manufacture, which is convenient to use, which can be employed by relatively unskilled personnel, which is sturdy in construction, which may be employed in any location where water and air under pressure are available, and which may be embodied in a one-piece unit which involves no moving parts.

Further objects and advantages of the invention will become apparent from the following description and claims, and from the accompanying drawings, wherein:

FIG. 1 is an elevational view, partly broken away, of a foam-generating apparatus according to the present invention, including a bucket containing detergent.

FIG. 2 is an enlarged horizontal cross-sectional view taken substantially on the line 2—2 of FIG. 1.

FIG. 3 is a longitudinal cross-sectional view taken substantially on the line 3—3 through the foam-generating conduit member of the assembly of FIG. 1.

FIG. 4 is an enlarged cross-sectional view taken on the line 4—4 of FIG. 3.

FIG. 5 is an enlarged cross-sectional view taken longitudinally through the detergent supply conduit and the strainer employed with the detergent supply conduit in the assembly of FIG. 1.

FIG. 6 is a longitudinal cross-sectional view taken through a modified form of foam-generating conduit member constructed in accordance with the present invention.

FIG. 7 is a side elevational view of a further modification of an improved foam-forming conduit assembly constructed in accordance with the present invention.

FIG. 8 is an elevational view of a still further modified form of foam-generating apparatus constructed in accordance with the present invention, wherein the air insertion means is spaced a substantial distance downstream from the venturi outlet chamber of the apparatus.

FIG. 9 is an elevational view of a still further modified form of foam-generating apparatus constructed in accordance with the present invention, wherein a pressure booster pump is utilized in the conduit connecting the venturi outlet chamber of the apparatus to the air insertion fitting.

FIG. 10 is an enlarged longitudinal cross-sectional view showing a composite foam-generating assembly including a pressure booster pump located between the venturi outlet chamber and the compressed air admission fitting of the assembly.

FIG. 11 is an enlarged longitudinal cross-sectional view, similar to FIG. 3, but showing a further modification of a foam-generating conduit member according to the present invention.

FIG. 15 is a cross-sectional view similar to FIG. 13 but showing a further modification.

FIG. 16 is a perspective view of the valve ball spring bearing spider of FIGS. 12, 13 and 14.

FIG. 17 is a longitudinal cross-sectional view taken through a flow-stabilized jet pump acording to the present invention.

FIG. 18 is a fragmentary cross-sectional view showing a modification of the embodiment shown in FIG. 17, wherein the apparatus is merely employed as a flow-regulating device.

Figure 12:
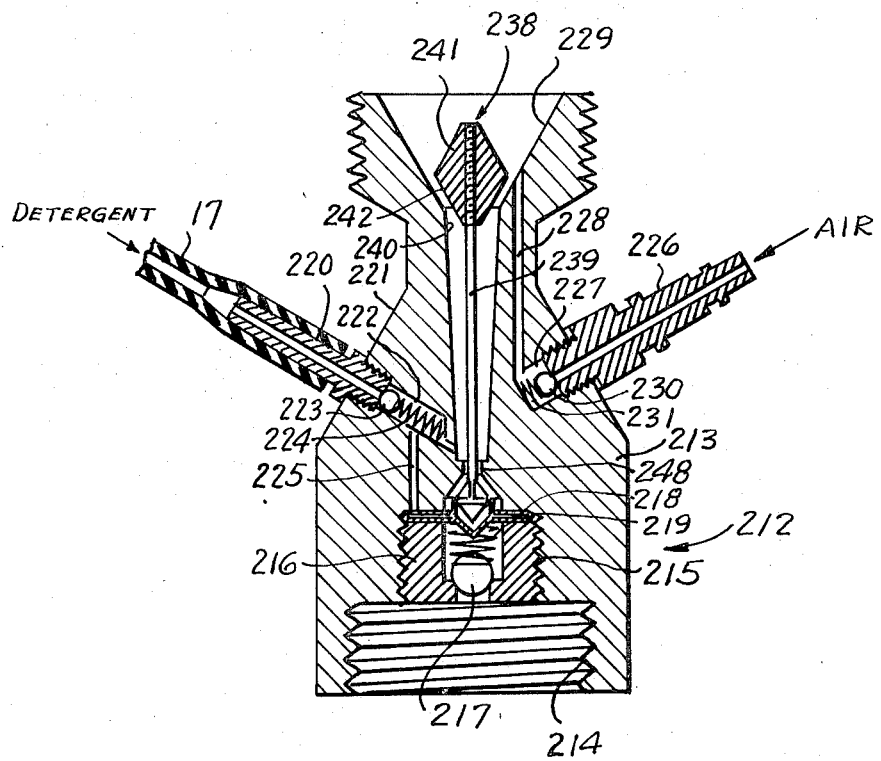
FIG. 12 is a longitudinal cross-sectional view taken through another modified form of foam-generating conduit member constructed in accordance with the present invention and employing a flow stabilizer.

A prime purpose of the present invention is to provide an improved apparatus to produce foam for use in detergent cleaning operations, first-fighting operations, and for any other purpose where a source of rich and highly adherent foam is desirable.

In recent years foam additives were put into cleaning compounds, which facilitated application on vertical and on the underside of horizontal surfaces, where foam must adhere in order to produce a satisfactory cleaning result.

The use of a foam spray for cleaning has been found to be more efficient than previous methods employed, and provides a saving in material, time and labor. Also, the use of a foam spray for fire fighting operations has been found to be more effective than previous methods employed.

Previous methods of producing foam have involved forcing a chemical-water solution through a high pressure spray nozzle, often located at the end of a discharge hose. This mixture is aerated by the atmosphere as it discharges from the nozzle and produces a spray foam of relatively poor quality, the foam being somewhat soupy, having poor consistency, and not being readily adherent to vertical and the underside of horizontal surfaces. Furthermore, in this method a poorer mixture is acquired, namely, more foam additives are required to produce a satisfactory mixture.

Also, it has been found that the use of a high pressure spray drives detergents and other harmful materials into seams, crevices, and the like, damaging paint surfaces and inducing corrosion.

As above mentioned, in the above-described methods, the foam spray is produced by forcing a mixture under high pressure through a relatively small exit nozzle opening, this principle being employed in any equipment for detergent cleaning operations as well as for foam fire fighting. The equipments employed to produce the foam spray through a nozzle involve relatively large and high pressure machines; some are gasoline powered and some use electric power, often 220-volts. The high pressure cleaning machines have reservoirs, mixing tanks, pressure pumps, water flow regulators, gauges, adjustments for chemical-water mixture, valves, non-standard hardware and hoses. The cleaning unit, therefore, is expensive, complicated and requires trained personnel for maintenance and operation. This is cumbersome, and some of these units require the use of a tow-tractor. Furthermore, gasoline engines cannot safely be used inside building, hangars, or in other areas where gasoline engines constitute a fire hazard. Also, sources of electric current, particularly 220-volts current, are not conveniently located at the various locations where foam may be required. In addition, high pressure cleaning units of this type have a short useful life, and the foam-producing qualities of the modern foam additives which may be employed for cleaning and fire fighting are not fully utilized in the high-pressure foam spray generating systems.

A second method of producing a foam spray, as practiced in the prior art, is by proportioning a chemical-water solution and then aerating the mixture with air. Foam units which use manual and automatic devices for control and operation often produce a satisfactory foam but are expensive and relatively complicated. They have many components, such as air-pressure gauges, air-pressure regulators, detergent mixture adjustments, O-ring seals, shut-off valves, water flow control devices, and non-standard hardware, some of which frequently become defective. Thus, such foam units suffer from frequent breakdowns and require lengthy repair and servicing. Satisfactory performance of this type of foam unit is dependent upon manual and automatic operation of the various components to produce the correct mixture of water, chemicals and air. The units have a relatively short useful life. Furthermore, foam-producing units of this type must operate under a relatively narrow range of certain fixed conditions of incoming chemical, water and air factors to perform satisfactorily. The units are large and heavy and must be adapted to use different sized containers. Furthermore, these units are not easily moved to locations where foam is required and they cannot easily be used with small, relatively mobile containers, such as buckets and standard 5-gallon cans. The many adjustments required to provide a satisfactory foam necessitate the use of a trained operator. The components of such units are frequently out of adjustment or are defective, whereby as a result no foam or a poor foam is available. When the check-valves of the system malfunction, air and water flow back into the detergent container, which soon dilutes the detergent and aerates the entire drum of detergent material, rendering it unsatisfactory for further use.

The apparatus of the present invention is intended to overcome the above-enumerated disadvantages and constitutes a small, relatively simple foam-generating unit which is inexpensive, easy to manufacture, easy to use, readily available, and one that resists abuse and may be employed wherever water and air pressure are available.

Referring to the drawings, and more particularly to FIGS. 1 through 5, 11 generally designates an improved foam generating apparatus constructed in accordance with the present invention. The apparatus 11 comprises a main foam-generating conduit assembly 12, presently to be described in detail, to which is connected a water supply conduit 13, leading from a suitable water supply source, for example, a source under hydrant pressure, and an air supply conduit 14, leading from a suitable compressed air source, such as a conventional air compressor employed for tire inflation, paint spraying, or the like. Connected to the outlet of the foam-generating conduit assembly 12 is a flexible conduit 15 provided at its discharge end with an elongated tubular wand 16 which is employed as a foam dispenser or applicator. Connected to the foam-generating unit assembly, as will be presently described, is a flexible supply conduit 17 for detergent or other chemical foam-forming material, the conduit 17 being provided at its intake end with a strainer tip 18. The portion of the conduit 17 including the tip 18 is adapted to be received in a suitable portable container for detergent or other chemical foam-forming material, for example, in the bucket 19 shown in FIG. 1. Thus, bucket 19 contains a quantity of detergent 20 and the flexible conduit 17 and its strainer tip 18 are received in the bucket 19 in the manner illustrated in FIG. 1.

Referring to FIGS. 4 and 5, it will be seen that the conduit 17 is provided with a check-valve 21 at its connection to the main foam-generating conduit assembly 12. Thus, the conduit assembly 12 comprises a main conduit body 22 and the detergent supply conduit 17 is connected to a fitting 23 secured in the upstream end portion of the body 22, as will be presently described, in communication with a passage 24 leading to the axial main flow bore of the conduit assembly. The check-valve 21 is of conventional structure and may comprise a housing containing a check ball 25 which is movably disposed therein but which seats against an opening 26 when back flow occurs, thereby preventing back flow of material into the conduit 17.

The strainer tip 18 comprises an elongated coiled spring which is secured in the end of the flexible conduit 17 in the manner shown in FIG. 5, and which is adapted to rest on the bottom of the bucket 19 and to allow detergent liquid to be drawn therethrough into conduit 17 while excluding solid particles. Thus, the tip 18 can merely consist of a sufficient number of turns of flexible wire forming a tapered enclosure, with the turns sufficiently close to prevent solid particles from passing therethrough.

As shown in FIG. 3, the conduit body 22 is formed at its inlet end with an internally threaded enlarged bore portion 28 to which may be threadedly connected a standard hose fitting 29 provided on the end of the water supply hose 13. A rubber sealing ring 30 is provided between the male fitting 29 and the inner end wall of the bore 28.

The conduit body 22 is formed with a reduced axially extending forwardly flaring venturi passage 31 whose smaller end opens centrally of the water supply bore 28, as shown in FIG. 3, the passage 31 flaring toward the outlet end of the body 22 and being of substantial length. The larger end of the bore 31 communicates at 32 with a relatively wide flare venturi outlet portion 33 which leads to an outlet chamber 34 at the left end of the body 22, as viewed in FIG. 3.

The foam discharge conduit 15 is provided with a conventional female fitting 35 which is threadedly connected to the outlet end of the conduit body 22 in the manner illustrated in FIG. 3, with the provision of a rubber sealing ring 36 between the female fitting 35 and the rim of the outlet chamber 34, as shown.

As shown in FIG. 3, the detergent enters passage 24 which is inclined in an upstream direction and connects with the venturi passage 31 near its smaller end. Thus, the axis of the detergent supply passage 24 may be inclined at an angle of approximately 60 degrees to the longitudinal axis of venturi passage 31, the detergent supply passage axis being directed toward the water intake end of the body 22, as shown. Thus, the direction of the entering detergent has a component which is in opposition to the direction of the incoming water flow, whereby the detergent must be changed in direction in the stream of water, which facilitates its mixture with the water. The water, which is under hydrant pressure, enters the relatively constricted smaller end of the venturi passage 31 and then flows at relatively great velocity through the gradually expanding venturi passage, producing a reduction in pressure in this region which provides the suction necessary to draw the detergent through the passage 24 and into the venturi passage 31. As shown in FIG. 3, the passage 24 is relatively small in diameter so that the detergent is actually injected in a thin jet into the passage 31, which facilitates its mixture with the water flowing through said passage. The injected detergent and water reach the relatively widely expanding outlet end portion 33 of the venturi passage wherein a thorough mixing action takes place. The mixed water and detergent thus move into the outlet chamber 34 of the conduit body 22.

The compressed air supply conduit 14 is connected to the output chamber 34 by an inclined fitting 40 which is inclined substantially in the manner illustrated in FIG. 3, namely, which is directed toward the outlet end of body 22 so that the jet of air injected through the injection passage 41 communicating with fitting 40 has a substantial velocity component in the direction of movement of the material flowing into the chamber 34. The angled air jet introduced into the chamber 34 produces a swirling action which provides very efficient foaming. Thus, the compressed air combines with the mixture of water and detergent in the chamber 34, producing a rich foam. The foam flows through the conduit 15 to the dispensing wand 16 and can be thus applied to the surfaces to be covered.

As above mentioned, the check valve 21 provided in the lower end portion of the conduit member 23, as viewed in FIG. 3, prevents backflow of the water-detergent mixture into the conduit 17, and thus prevents dilution of the detergent or other foam-forming material contained in the bucket or container 19.

As shown in FIG. 3, the air-fitting 40 has its axis at an angle of approximately 60 degrees to the axis of the conduit body 22, and the air injection passage 41 may be even more further inclined, for example, may be inclined so that it is at an angle of approximately 30 degrees to the flow axis. This provides a substantial velocity component in the direction of flow and facilitates the foaming action as well as the suction effect on the material drawn through the successive venturi flow passages 31 and 33.

It will be noted that the size of the inlet end of the venturi passage 31 is relatively small as compared with the size of the inlet end of the conduit member 22, and that the size of the detergent ejection port 24 is similarly very small relative to the size of the venturi passage 31. The relative sizes of the passages 24, 31 and the water inlet space are in accordance with the desired proportions of water and chemical, and in accordance with the length of the venturi passage 31, which should be sufficient to provide an adequate mixing of the water and chemical.

In operation, the conduit member 22 is attached to the respective water supply and foam discharge hoses 13 and 15 and the water is turned on. The suction hose 17 is then placed in the bucket 19 containing the liquid 20. The compressed air hose 14 is then connected to the conduit member 12 and the compressed air is turned on. The mixture and detergent entering the aeration chamber 34 is mixed with air and a rich foam is generated which is delivered through the hose 15 to the dispensing wand 16 so that it may be applied to the surface intended to be covered with foam.

It will be noted that the apparatus above described can be quickly put in operation, requires no valves and does not involve the use of electric motors, or other expensive equipment. A satisfactory foam will be generated under widely variable conditions of water pressure and air pressure, and no manual valve adjustments and similar manual adjustments are needed for its use.

The chemical-water mixture introduced into the chamber 34 becomes aerated when air under pressure is admitted into the chamber through port 41. The flow action develops reduced pressure in the venturi passages 33, 31, whereby suction is provided at the detergent entry passage 24. As above mentioned, the force of the compressed air admitted through passage 41 is directed downstream into the mixture and helps provide even and rapid flow of the foam and aerates the mixture that flows to the outlet hose 15, the mixture leaving conduit 12 in the form of a rich foam which is smooth and consistent and which immediately adheres to vertical surfaces and to the underside of horizontal surfaces.

It will be further noted that standard garden hose sections may be employed as the water supply conduit 13 and the foam outlet conduit 15.

Referring now to FIG. 6, the reference numeral 50 designates a modified form of foam-generating conduit member which is provided with a water intake internally threaded bore 28' similar to the corresponding internally threaded bore 28 of FIG. 3 and adapted to be connected thereby to a water-supply hose 13. Similarly, the conduit member 50 is provided with a gradually flaring axial first venturi passage 31' communicating with a widely flaring second venturi passage 33' similar to the passages 31 and 33 in FIG. 3. Likewise, the conduit member 50 is provided with an inclined injection passage 24' for injecting detergent from a detergent fitting 23', to which the detergent supply hose 17 is connected, similarly to the previously described device illustrated in FIG. 3.

The fitting 23' may be provided with a check-valve assembly 21 such as that illustrated in FIG. 4. It will be seen that the conduit member 50 has a substantially frusto-conical inlet end portion 54, with the detergent-supply fitting 23' positioned substantially normal to its surface, so as to define the above-described inward, axial inclination of its discharge passage, aligned with detergent injection passage 24'. A compressed air supply fitting 40' is similarly mounted normal to the surface of portion 54 and communicates with an air injection passage 55 extending parallel to the axis of the conduit member 50 and opening at the smaller end portion of the wide-flare passage 33'. It will thus be seen that compressed air introduced through passage 55 will provide considerable force in the discharge direction as well as the desired aeration of the water-detergent mixture.

The wide-flare passage 33' thus serves as part of the aeration chamber of the assembly, the delivery hose 15, connected to the externally threaded portion 51, serving as an extension of the aeration chamber. Therefore, the conduit 50 operates in a manner substantially similar to the manner of operation of the previously described conduit assembly 12.

FIG. 7 discloses a further modification wherein a conduit member 50' is employed very similar to the conduit member 50 except that it does not include a compressed air injection means. The externally threaded outlet end of the conduit member 50' is connected to a further conduit 52 which acts as an aeration chamber, said conduit 52 having an inclined compressed air fitting 40' connected thereto, the fitting 40' leading to an injection port 41' which is angled to provide an air jet having a substantial velocity component in the direction of flow, as in the case of the air injection port 41 shown in FIG. 3. It will thus be seen that the wide-flare bore 33' communicates directly with the internal bore of the aeration chamber or conduit 52 and that the injection port 41' admits compressed air to provide the foaming action similar to that obtained with the device illustrated in FIG. 3. However the conduit member 52 may be of any desired length, in accordance with the type of detergent material employed, and the two-piece construction of the foam-generating assembly provides a further advantage in that it may be readily disassembled for cleaning out the aeration chamber whenever necessary.

In the modification illustrated in FIG. 8, the conduit member 50' is separated from the aeration chamber conduit 52 by a length of flexible hose 60, whereby the detergent-water mixture is conveyed from the mixing conduit member 50' to the aeration conduit member 52 through the flexible hose 60, and the foaming action takes place essentially in the aeration chamber 52. The dispensing wand 16 is connected directly to the outlet of the aeration chamber conduit 52, so that the foam-generating action takes place very close to the point of distribution thereof providing foam of maximum richness and with a uniform foam consistency at the point of discharge from the tubular wand 16.

In the modification illustrated in FIG. 9, the outlet of the conduit 50' is connected by a hose 66 to the inlet of a conventional pressure booster pump 67, and the outlet of the booster pump 67 is connected by a flexible hose 68' to the inlet end of aeration member 52, similar to that shown in FIGS. 7 and 8. Thus, the booster pump 67 builds up the pressure of the water-detergent mixture so that it is furnished to the aeration conduit member 52 under considerable pressure, facilitating the foaming action taking place in said conduit member 52. Similarly, the pressure build-up provided by the booster pump 67 facilitates the discharge of the generated foam through the dispensing wand 16, enabling foam of maximum richness and uniformity of consistency to be delivered to the point of application.

In the embodiment illustrated in FIG. 10, a conventional booster pump 67' is connected directly between the mixing conduit member 50' and the mixing conduit member 52. With this arrangement the outlet end of the aeration conduit member 52 may be connected to the tubular dispensing wand 16 either directly or by means of a length of flexible hose 15, as in the case of the embodiment of the invention illustrated in FIGS. 1 to 5.

The booster pump 67 or 67' may be of any conventional type, and may be of a type driven by a small electric motor incorporated therein.

In any of the previously described embodiments of the invention, the inlet conduit for the detergent material may be omitted where the supply conduit 13 is connected to a source of pre-mixed chemical-water solution. Thus, where the pre-mixed chemical-water solution is admitted to the conduit 13, the solution will be aerated in a similar manner as previously described whereby to generate the desired foam.

Where a booster pump is employed, as in FIGS. 9 and 10, the pressure booster cooperates with the air injection passage in the mixing conduit member to create increased suction in the venturi passages, increasing the capacity of the venturi while maintaining substantially the same proportionality of chemical-water mixture as would be obtained without the use of the pressure-booster pump. The proportional increase in the amount of compressed air which must be used can be obtained by increasing the orifice size of the air injection passage employed with the aeration conduit member 52. The increase in foam exit pressure would be such as to meet the needs for high-pressure detergent foam cleaning or to provide longer reach in fire-fighting.

FIG. 11 illustrates a further modified form of foam generating apparatus according to the present invention. The apparatus is designated generally at 112 and may be used as a substitute for the foam-generating conduit assembly 12 previously described. Thus, the foam-generating conduit assembly 112 comprises a main conduit body 122 formed with an internally threaded water supply bore portion 128 adapted to be supplied with water under hydrant pressure from a pipe or conduit 113 suitably connected to body 122 at the internally threaded bore portion 128. The body 122 has an outlet chamber 134 which is externally threaded to receive a fitting, such as the fitting 35 shown in FIG. 3, providing a connection to the conduit 15 and the dispensing wand 16. A shut-off valve 101 may be included in the connection between conduit 15 and wand 16, as shown in FIG. 11.

The body 122 is formed with a water intake chamber 140 which is in communication with the water supply conduit 113 through a check valve assembly 141 including a spring pressed ball 142 biased to engage a valve seat 143 by a coil spring 144 which bears between the ball 142 and abutment ring 146. Spring 144 biases ball 142 to prevent back flow of liquid or air from chamber 140 toward conduit 113. Chamber 140 communicates with an axially extending, substantially cylindrical bore portion 147 which communicates with a flaring venturi passage 148 through a restricted intermediate bore portion 149. The wide end of passage 148 communicates with a further widely flaring frusto-conical bore portion 149 whose larger end merges with the outlet chamber 134, as shown.

Metering control of liquid flow through passage 147 is provided by the presence of a metering flow valve member 150 which is threadedly engaged in body 122 transverse to bore 147 and which can be adjusted inwardly or outwardly to regulate the liquid flow through bore 147. The valve member 150 may be locked in adjusted positon by the provision of a lock nut 151 threadedly engaged on the valve member 150 and being clampingly engageable with the external side surface of body 122, as shown. A water pressure gauge 152 is provided on body 122 adjacent control valve 150 and located downstream therefrom, the gauge 152 communicating with bore 147 through a passage 153.

The detergent supply conduit 17 is connected to a supply fitting 123 which communicates with an inclined detergent supply passage 124 leading to the smaller end of the flaring venturi passage 148, a ball check assembly 160 being provided between fitting 123 and passage 124 to prevent back flow of detergent, water or air. The passage 124 is inclined relative to the venturi passage 148 substantially in the same manner previously described in connection with passage 24 and venturi passage 31 of the embodiment shown in FIG. 3.

Fitting 123 may be provided with a detergent metering screw 162 to regulate the rate of supply of detergent.

Body 122 is formed with a water by-pass passage 170 which extends substantially parallel to passages 147 and 148, and which communicates at one end with the water intake chamber 140. A water by-pass metering valve 171 is provided at the junction between passage 170 and chamber 140, which may be employed to regulate the supply of water to passage 170, or to shut off same, if so desired. An inclined nozzle member 173 is provided at the opposite end of passage 170, said nozzle member 173 projecting into the outlet chamber 134, as shown, and being inclined inwardly and forwardly, namely, inwardly and toward the direction of flow out of body 122.

The compressed air supply conduit 14 is connected to an air inlet fitting 180 provided with a check valve assembly 163 and with an air metering or shut-off valve 164, the valve 164 being located upstream relative to the check valve assembly 163, as shown. Air fitting 180 has an internal bore which communicates through valve assembly 164 and check valve assembly 163 with an inclined air supply conduit element 181 secured in body 122 and extending coaxially through nozzle member 173. An air pressure gauge 165 is mounted on the wall of body 122 and communicates through a passage 166 with conduit 181, said conduit being provided with a suitable aperture registering with passage 166 to provide such communication.

In operation, water is mixed with detergent in the smaller end portion of venturi passage 148, in a manner generally similar to that described for the previously disclosed embodiments of the invention, the mixture of detergent and water moving into the chamber 134 through the wider end of passage 148 and the further flaring outlet passage portion 149, this mixture being aerated by the compressed air injected into chamber 134 through conduit 181 and providing a foam, as in the previously described embodiments of the invention. A regulated amount of additional water may be furnished through by-pass passage 170 and conduit 173, the additional water being injected into chamber 134 along with the compressed air, so that the water content of the foam may be very accurately regulated. As in the previously described embodiments of the invention, the air inlet conduit 181 is inclined in a downstream direction so that the air injected into chamber 134 has a substantial velocity component in the direction of movement of the material flowing into the chamber. Thus, as in the previously described embodiments of the invention, the angled air jet introduced into chamber 134 produces a swirling action which provides very efficient foaming. Thus, the compressed air combines with the mixture of water and detergent in the chamber 134, producing a rich foam, and the amount of liquid content of this foam can be accurately regulated by means of the by-pass water-regulating valve member 171. Likewise, the percentage of detergent admitted may be regulated by means of the detergent metering valve screw 162. An additional degree of regulation is provided by means of the main water-metering valve member 150. The by-pass water regulating valve member 171 when fully open serves to lower the differential pressure through the venturi so that no detergent is drawn through detergent supply passage 124, therefore automatically providing an adequate quantity of only clear rinse water through both the by-pass passage 170 and the venturi passage 148 to chamber 134 into the outlet hose. If desired, the air metering or shut-off valve 164 may be closed at this time to prevent entrance of air into the rinse water. Thus, only one connected outlet hose s required for both applying a chemical mixture or detergent foam and later rinsing with clear water.

Figure 13:
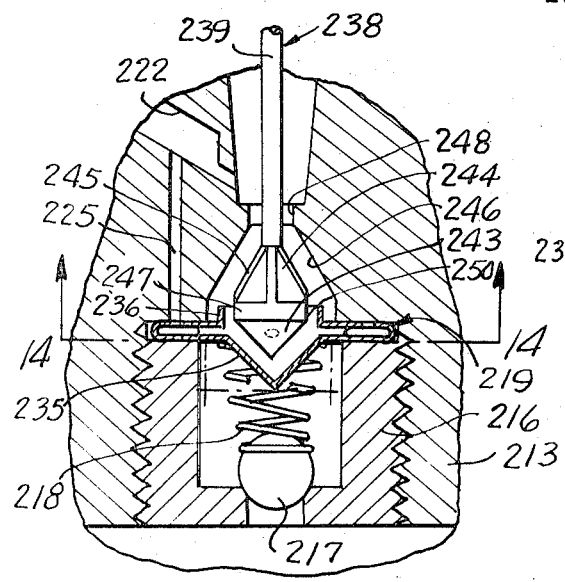
FIG. 13 is an enlarged fragmentary longitudinal cross-sectional view of the water intake check valve portion of the flow-stabilizing foam-generating conduit member of FIG. 12.
Figure 14:
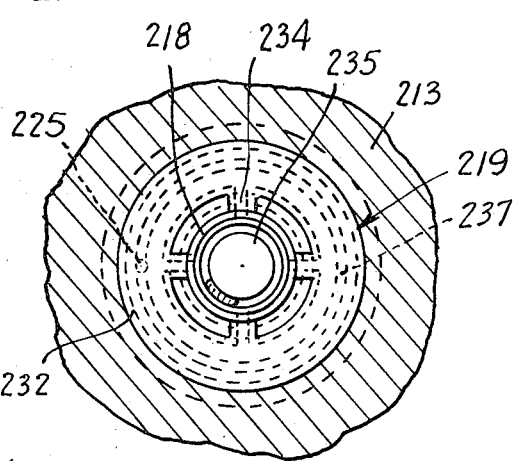
FIG. 14 is a horizontal cross-sectional view taken substantially on line 14—14 of FIG. 13.

FIGS. 12, 13 and 14 show a modified form of foam-generating conduit assembly, designated generally at 212 which may be employed as a substitute for the assembly shown in FIG. 6. The main body of the conduit member is shown at 213 and is provided with a water intake internally threaded bore 214 adapted to be connected to a suitable water supply hose. The body 213 is formed with a reduced further internally threaded bore 215 in which is threaddedly engaged an annular ball seat member 216 containing a check valve ball 217 biased toward seating position by a coil spring 218 bearing between the ball 217 and a spider member 219 interposed between the member 216 and the top wall of the recess containing same. A detergent inlet fitting 220 is connected to the body 213 at its frusto-conical portion 221 and communicates with a cavity 222 containing a check valve ball 223 which is biased toward seating engagement with the inner end of the bore of conduit 220 by a coil spring 224. Chamber 222 communicates with the top end of the bore 215 by the provision of a small-diameter passage 225.

An air inlet conduit fitting 226 is connected to frusto-conical portion 221 in communication with a cavity 227 which is communicatively connected by a passage 228 to the widely flaring top venture passage 229, corresponding to the passage 33' in FIG. 6. The inner end of air intake conduit fitting 226 is provided with a spring-biased check valve ball 230 urged against the inner end of the bore rim of fitting 226 by a biasing spring 231.

The spider member 219 comprises a hollow annular rim portion 232 connected by four equally spaced radial conduit elements 234 to a downwardly directed central hollow cone 235, the radial conduit elements 234 being connected to an upstanding cylindrical skirt portion 236 provided at the top rim of cone 235. The main annular rim 232 is provided at its top wall with a circular slot 237 which registers with the previously-mentioned passage 225.

The dimensions of the area between the radial conduit element 234 are designed to provide a lower maximum flow capacity than the maximum flow capacity of inlet passage 248 of body 213.

Designated generally at 238 is a flow stabilizing member comprising a vertical shank portion 239 which extends through the gradually flaring central venturi passage 240, corresponding to the passage 31' of FIG. 6. Adjustably threadedly engaged on the top end of the stem member 239 is a double-conical member 241 whose lower conical element 242 defines an annular flow passage with respect to the adjacent conical wall of the passage 229. Rigidly secured to the bottom end of the stem member 239 is a double conical member 250 having a cylindrical skirt portion 247 between a downwardly directed bottom cone element 243 depending into the hollow cone 235 of spider member 219 and an upwardly directed cone element 244 having equally spaced raised elemental vanes 245, namely, straight raised rib-like vanes extending from the base toward the apex of the conical element 244. As shown in FIG. 13, upper conical element 244 with the raised vanes 245 extends through the gradually flaring entrance passage 246 which communicates with the inner cavity of the annular check ball seat member 216. The vanes 245 are elevated above the surface of conical element 244 so as to present clearance shoulders to prevent complete sealing action between conical element 244 and the downwardly flaring fruso-conical wall surface of entrance passage 246. This thereby provides means to limit the flow to not less than a desired minimum.

As shown in FIG. 12, the conical top element 242 is relatively large as compared with the conical bottom element 243. During normal operation, the member 238 is substantially free-floating, with the conical elements 243, 244, 242 and cylindrical portion 247 adjusting themselves relative to their associated conical recesses 235, 246, 229 and cylindrical skirt portion 236 of spider member 219 to provide an equilibrium position of the member 238.

Member 241 is adjustable on stem 239 to provide more or less clearance for the conical elements 243, 244 and 242. Adjustment may thus be made for fluids of different viscosity to provide a specific flow volume or desired mixture ratio.

As above-mentioned, raised vanes 245 are shaped to prevent sealing action of conical element 244 on the surface 246 and to provide a minimum small free clearance.

The large cone 242 may at times seat against the conical surface 229, so as to act as a check valve to prevent backflow through the device, such as when there is a line pressure drop. In operation as a foam-forming device, compressed air enters the mixture via passage 228 beyond the large double conical member 241 and builds up a greater pressure in the line beyond the member 241 than the incoming water pressure when a shut off valve is closed, such as a valve 101 ahead of the wand 16. This greater pressure causes the larger cone to seat and act as a check valve.

The cone elements and stem are preferably made of relatively light material and may be hollow, so that operation of the device 212 in any position or attitude is substantially the same.

It will be noted that the body 213 is formed with an inlet passage 248 immediately above the conical cavity 246. The maximum capacity of flow through inlet passage 248 is determined by the area difference between the area defined by the diameter of the passage 248 and that defined by the diameter of the stem 239. Installation of a smaller or larger diameter stem 239 will correspondingly increase or decrease the maximum capacity, as desired, of a given unit 212. This will also provide an increased or decreased mixture ratio. Inlet passage 248 is designed to provide a minimum flow greater than the maximum flow between the radial conduit elements 234 of spider assembly 219.

By employing larger or smaller calibrated inlet and/or outlet cones, a change to a higher or lower flow volume (within the capacity range) may be obtained. In the same manner, a higher or lower desired suction pressure may be obtained, and therefore, a higher or lower mixture ratio.

The operation of the device 212 shown in FIG. 12 is substantially as follows:

Fluid under pressure flows to the inlet recess of member 216 past check ball 217 and through the hollow annular rim portion 232 between the four radial conduit elements 234 and then passes between the cylindrical skirt portion 236 of spider 219 and the cylindrical chamber wall of member 216, then entering between the conical element 244 and inlet conical recess 246. The relatively high pressure inlet fluid flow creates a venturi effect as it leaves the restricted passage between cylindrical skirt portion 236 and the cylindrical chamber of member 216 and thus creates a suction force through the small clearance between cylindrical skirt portion 247 and cylindrical skirt portion 236 in the conical recess of hollow conical member 235, tending to move conical member 243 opposite to the direction of flow, thereby tending to increase the clearance between conical element 244 and conical recess 246 and to thereby admit an increased flow of fluid. At the same time, this force is transmitted by the stem member 239 to the large cone member 242 in the downstream portion of the device, tending to move it toward the conical surface 229, thereby reducing the clearance between cone element 242 and said surface 229. The resultant reduced pressure of the mixture flowing past member 241 exerts an increasing force on the larger calibrated cone element 241 in the direction of flow as the clearance between conical element 242 and conical surface 229 is reduced. This increasing force tends to enlarge said clearance by urging conical member 241 in the direction of flow, this force being transmitted through the stem member 239 to the smaller double conical member 250, generating a counter-acting force in the opposite direction, the opposite forces being eventually equalized and a balance therebetween being reached.

Fluid flowing through the device 212 entrains material from the detergent conduit 17 which mixes with the main driving fluid and acquires a part of its energy in the relatively larger diffusor outlet end of the device 212. The velocity of the mixture is such as to convert it to a pressure substantially lower than the inlet driving fluid pressure. Thus, the device operates with a relatively high inlet fluid pressure and a relatively low outlet fluid mixture pressure. The pressure of the fluid mixture is reduced as it is diffused (changes direction) against the larger cone element 242, and the fluid mixture pressure immediately beyond the larger cone element 242 is further reduced because of the enlarging diffusor space provided in the chamber defined by the conical recess 229. Thus, the pressure of the fluid mixture is substantially greater before and during its passage adjacent the large cone element 242 than the pressure of the fluid mixture immediately beyond said larger cone element. This differential in pressure generates force in the direction of flow as it is diffused (changes direction) against the larger cone element 242, as it flows through the restricted passage defined between cone element 242 and conical surface 229. Under equilibrium conditions, the above-mentioned differential pressure acting on member 241 exerts an equal and opposite force to the suction force exerted on the inlet conical element 243 through passage 225 and suction created by the relatively high pressure incoming fluid as it leaves cylindrical skirt portion 236 of spider assembly 219. Thus, for the desired flow rate, the effective areas of the cones are so designed that the force acting against the larger cone element 242 less the back pressure force is equal to the suction force exerted against the smaller cone element 243.

Since the respective cone elements are connected by the stem member 239, the forces at equilibrium act in opposite directions and maintain a balanced position of the floating composite flow-regulating member. A force tending to increase the clearance between the outlet cone element 242 and the conical surface 229 tends to close or reduce the clearance between the inlet cone element 244 and the conical surface 246 and thereby reduce or restrict the flow. Thus, a varying driving fluid inlet pressure will be automatically compensated for by the movement of the cone elements 244 and 241, to maintain a substantially constant flow volume and a substantially constant differential pressure between the inlet and outlet pressures, and thereby also maintain a substantially constant suction pressure acting on the detergent supply conduit 17. Because of these factors, a substantially constant mixture ratio is maintained.

A changing back pressure in the diffusor chamber 229 due to changes in distributing hose or pipe sizes, restrictions, or variations in the heights of the distributing hose or pipe will be automatically compensated for by the device 212. Thus, if the changes are such as to lessen the force against the larger cone element 242 in the direction of flow, this will allow the smaller cone 244 to move in a direction to enlarge the clearance between this smaller cone element and the conical wall of the recess 246, providing the necessary compensation to maintain the same flow at different heights.

The passage 225 allows a small amount of water or incoming material to be admitted into the suction chamber 222 by the venturi action of the main incoming fluid immediately beyond passage 248. Although this slightly reduces the total injection capacity, it provides expansion of the effectiveness of the device over a widened range of operating conditions.

The passage 225 and 225' may be omitted in FIGS. 12 and 13, and in the embodiments of FIGS. 17 and 18, presently to be described, if so desired, for example, as shown in the embodiment illustrated in FIG. 15.

Referring now to FIG. 15, in accordance with the omission of the passage 225, the entire venturi suction force in the hollow conical member 235 is provided by the venturi action of the fluid flow as it passes cylindrical skirt portion 236 of spider member 219. The operation of the embodiment of FIG. 15 with passage 225 omitted is substantially similar to that of the embodiment shown in FIGS. 12, 13 and 14 and FIGS. 16, 17 and 18, presently to be described, wherein suction in hollow conical member 35 is provided by a passage similar to passage 225. However, the device of FIG. 15 acts essentially as a proportioner or pump rather than as a foam forming device.

FIG. 17 illustrates an embodiment wherein the flow stabilizing member previously described is employed in an injection or pump device, designated generally at 300. The device 300 employs a hollow spider 219, clamped between a check ball-containing cup member 213' and a venturi nozzle fitting 301 threadedly engaged in the suction chamber 302. The nozzle 301 is formed with the conical inlet cavity 246' cooperating with the smaller conical member 244 in a manner similar to that above described in connection with the embodiment of FIG. 12, and is provdied with the flaring passage 304 surrounding the stem member 239 and providing a passage for flow of the high pressure inlet driving fluid into the suction space 302. The fluid to be injected, such as steam, gas, or liquid is admitted into the space 302 through a lateral conduit element 305 connecting the supply conduit 306 for said fluid to the space 302. The suction space 302 communicates with the outlet diffusion chamber 307 through a convergent frusto-conical passage 308, a cylindrical bore 309 and the outwardly flaring conical space 229'. Suction is developed in the space 302 by the expansion of the driving fluid as it passes through the flaring passage 304, causing reduction in pressure and increase in velocity of the driving fluid as it enters the space 302. The fluid from the supply conduit 306 is aspirated through the passages 308 and 309 into the flaring conical space 229' and into the discharge diffusion space 307. The stabilizing unit defined by cone members 241, 243 and stem 239 provides similar action to that described above in connection with the embodiment of FIGS. 12, 13, 14 and 16. However, the device of FIG. 17 acts essentially as a jet pump rather than as a foam-forming device.

It will be noted that the chamber 302 may be connected with the hollow rim portion of the spider member 219 by passages 225', allowing a small amount of incoming water or fluid from the hollow conical member 235 to be mixed by venturi action with the injected fluid in chamber 302. This provides an extension of the range of operating conditions under which the jet pump device is effective although it slightly reduces its injection capacity.

The same concept present in the embodiments of FIGS. 12, 15 and 17 with respect to flow regulation may be employed in a fluid flow system, employing the device of FIG. 17 with the omission of the lateral fluid supply conduit 305, which may be replaced by a conventional plug, or which may be entirely omitted in the manner illustrated in FIG. 18. Thus, FIG. 18 shows a structure similar to that of FIG. 17, with no provision for injection of other fluid besides the main fluid which passes through the device. The device of FIG. 18, designated generally at 300' may be employed merely to regulate flow in a line and to maintain a constant exit volume flow and pressure. Except for the injection feature, the device of FIG. 18 is the same as the device of FIG. 17, and stabilization action is the same as that above-described. Operation of the device of FIGS. 17 and 18 with passage 225' omitted is substantially similar to the embodiment shown in FIG. 15.

While certain specific embodiments of fluid flow control devices have been disclosed in the foregoing description, it will be understood that various modifications within the spirit of the invention may occur to those skilled in the art. Therefore, it is intended that no limitations be placed on the invention, except as defined by the scope of the appended claims.

What is claimed is:

1. A foam-generating device comprising a conduit member having an inlet and an outlet end, means to connect said inlet end to a water supply source, said inlet end having a relatively large-diameter water-receiving cavity, with a transverse wall, said conduit member being formed with passage means extending from the rear of said transverse wall toward said outlet end and including a relatively small-diameter axial, first venturi passage of substantial length gradually flaring in size toward said outlet end, said member being further formed with a relatively wide-flare passage merging with the larger end of said first venturi passage and flaring therefrom toward said outlet end, and said conduit member being formed with an inclined detergent-admission passage angled toward said inlet end and opening into said first venturi passage, means to connect said detergent-admission passage with a source of liquid detergent, means defining an aeration chamber, means communicatively connecting said aeration chamber to the larger end of said wide-flare passage, and means to inject compressed air in a downstream direction into the region adjacent the larger end of said wide-flare passage, whereby to provide aeration of and foaming action in the mixture of water and detergent discharging from said wide-flare passage.

2. The foam-generating device of Claim 1, and a flexible delivery conduit provided with a tubular dispensing wand connected to the outlet end of the aeration chamber means.

3. The foam-generating device of Claim 1, and wherein said aeration chamber means is spaced from said conduit member and is connected thereto by a flexible conduit.

4. The foam-generating device of Claim 1, and wherein said conduit member has an air injection passage opening at the wall of said wide-flare passage and the means to inject compressed air comprises a source of compressed air connected to said air injection passage.

5. The foam-generating device of Claim 1, and wherein said aeration chamber means comprises a relatively large-diameter cavity formed in the outlet end of the conduit member.

6. The foam-generating device of Claim 5, and wherein said last-named large-diameter cavity has air injection conduit means inclined toward the outlet end of the conduit member, and the means to inject compressed air comprises a source of compressed air connected to said air injection conduit means.

7. The foam-generating device of Claim 6, and wherein the means to connect the detergent-admission passage to a source of detergent includes a check valve preventing backflow through said detergent-admission passage.

8. The foam-generating device of Claim 7, and wherein the means to connect the detergent-admission passage to a source of detergent comprises a flexible conduit having an elongated strainer at its intake end.

9. The foam-generating device of Claim 5, and wherein said conduit member is formed with a water by-pass passage extending from said large-diameter water-receiving cavity to said large-diameter cavity formed in the outlet end of the conduit member.

10. The foam-generating device of Claim 9, and adjustable flow-regulating means in said by-pass passage.

11. The foam-generating device of Claim 10, and wherein said by-pass passage is provided with discharge nozzle means in said last-named large-diameter cavity concentrically surrounding said means to inject compressed air.

12. The foam-generating device of Claim 11, and adjustable flow-regulating means in said first-named passage means located upstream from said detergent admission passage.

13. The foam-generating device of Claim 1, and a booster pump means between the wide-flare passage and said aeration chamber means.

14. The foam-generating device of Claim 13, and wherein said aeration chamber means comprises a relatively large-bore conduit spaced from said wide-flare passage, and wherein said booster pump means is connected directly between said wide-flare passage and said large-bore conduit.

15. The foam-generating device of Claim 1, and flow-regulating means located in said passage means, said flow-regulating means comprising a free-floating stem member provided with opposite enlarged end portions, one enlarged end portion being located within the inlet end of said first venturi passage and the other enlarged end portion being located within said wide-flare passage.

16. The foam-generating device of Claim 15, and wherein said other enlarged end portion is substantially larger in size than said one enlarged end portion.

17. The foam-generating device of Claim 16, and wherein said one enlarged end portion is provided with abutment means engageable with the inlet end of said first venturi passage to prevent complete sealing action when said one enlarged end portion moves toward said inlet end of the first venturi passage.

18. The foam-generating device of Claim 17, and wherein said inlet end of the first venturi passage is formed with a convergent conical recess containing said abutment means.

19. The foam-generating device of Claim 17, and wherein said conduit member is provided with a check valve between its inlet end and the inlet end of said first venturi passage.

20. The foam-generating device of Claim 19, and a spider member mounted between said check valve and said one enlarged end portion, said spider member having a central depressed portion in which said one enlarged end portion is receivable.

21. The foam-generating device of Claim 20, and wherein said spider member is hollow and has an inlet aperture adjacent its periphery and said conduit member is formed with a passage communicatively connecting the detergent admission passage to said inlet aperture.

22. The foam-generating device of Claim 20, and wherein said one enlarged end portion has a conical bottom configuration and said central depressed portion is correspondingly of conical shape.

23. The foam-generating device of Claim 22, and wherein said larger other enlarged end portion has a conical surface extending substantially parallel to said wide-flare passage.

24. The foam-generating device of Claim 23, and wherein said larger other enlarged end portion is adjustably mounted on said stem member.

25. The foam-generating device of Claim 23, and wherein said larger other enlarged end portion is threadedly engaged on said stem member for adjusting its position thereon.

References Cited

UNITED STATES PATENTS

| Number | Date | Name | Class |
|---|---|---|---|
| 1,954,154 | 4/1934 | Urquhart | 252—395 E UX |
| 2,146,605 | 2/1939 | Timpson | 261—Dig. 26 UX |
| 2,183,561 | 12/1939 | Hamblin | 252—359 E UX |
| 2,198,585 | 4/1940 | Urquhart et al. | 261—Dig. 26 UX |
| 2,361,150 | 10/1944 | Petroe | 137—604 X |
| 2,556,239 | 6/1951 | Tuve et al. | 261—Dig. 26 UX |
| 2,684,949 | 7/1954 | McMillan et al. | 252—359 D X |
| 2,899,971 | 8/1959 | Munter | 137—604 X |
| 3,074,697 | 1/1963 | Friedell | 239—428 X |
| 3,188,055 | 6/1965 | Lutjens et al. | 259—4 |
| 3,727,640 | 4/1973 | Sargeant | 137—604 |

JACK SOFER, Primary Examiner

U.S. Cl. X.R.

222—193; 137—604; 239—311